(12) United States Patent
Mayhew et al.

(10) Patent No.: US 7,899,030 B2
(45) Date of Patent: *Mar. 1, 2011

(54) ADVANCED SWITCHING ARCHITECTURE

(75) Inventors: David E. Mayhew, Northborough, MA (US); Todd R. Comins, Chelmsford, MA (US); Lynne M. Brocco, Cambridge, MA (US)

(73) Assignee: Jinsalas Solutions, LLC, Dover, DE (US)

( * ) Notice: Subject to any disclaimer, the term of this patent is extended or adjusted under 35 U.S.C. 154(b) by 1022 days.

This patent is subject to a terminal disclaimer.

(21) Appl. No.: 10/660,188

(22) Filed: Sep. 11, 2003

(65) Prior Publication Data

US 2004/0128410 A1 Jul. 1, 2004

Related U.S. Application Data

(60) Provisional application No. 60/409,792, filed on Sep. 11, 2002.

(51) Int. Cl.
H04L 12/28 (2006.01)
H04L 12/56 (2006.01)
H04J 3/26 (2006.01)

(52) U.S. Cl. .................. 370/351; 370/389; 370/392; 370/432

(58) Field of Classification Search .......... 370/389, 370/392, 401–404, 408
See application file for complete search history.

(56) References Cited

U.S. PATENT DOCUMENTS

| | | | |
|---|---|---|---|
| 5,826,048 A | 10/1998 | Dempsey et al. | |
| 6,115,393 A * | 9/2000 | Engel et al. | 370/469 |
| 6,131,119 A | 10/2000 | Fukui | |
| 6,151,651 A | 11/2000 | Hewitt et al. | |
| 6,260,092 B1 | 7/2001 | Story et al. | |
| 6,418,504 B2 | 7/2002 | Conway et al. | |
| 6,446,142 B1 | 9/2002 | Shima et al. | |
| 6,529,963 B1 | 3/2003 | Fredin et al. | |
| 6,556,541 B1 | 4/2003 | Bare | |
| 6,567,876 B1 | 5/2003 | Stufflebeam | |
| 6,636,512 B1 * | 10/2003 | Lorrain et al. | 370/392 |
| 6,646,983 B1 | 11/2003 | Roy et al. | |
| 6,658,521 B1 | 12/2003 | Biran et al. | |
| 6,711,647 B1 | 3/2004 | Holehan | |

(Continued)

FOREIGN PATENT DOCUMENTS

WO   WO 94/00937   *  1/1994

OTHER PUBLICATIONS

Official Action issued in U.S. Appl. No. 10/945,633 dated Sep. 6, 2007, 10 pages.

(Continued)

*Primary Examiner*—Pankaj Kumar
*Assistant Examiner*—Hicham B Foud

(57) ABSTRACT

The present invention provides a system and method for encapsulating protocols across a switching fabric network. Packets, which may utilize any underlying protocol, are encapsulated with a route header. This route header contains path routing, traffic and packet size information. A novel path routing scheme is used to route packets across the fabric, where the fabric has a plurality of switches, each having a plurality of ports. Each switch uses only data from within the packet and its own port count to determine the appropriate output port. There is no need to node or address lookup mechanisms in the switches.

18 Claims, 6 Drawing Sheets

| +0 | +1 | +2 | +3 |
|---|---|---|---|
| 7 6 5 4 3 2 1 0 | 7 6 5 4 3 2 1 0 | 7 6 5 4 3 2 1 0 | 7 6 5 4 3 2 1 0 |
| Turn Pool [6:0] | Bit Count [23-63] CT BQ | Traffic Class | Credit Length | Protocol Encapsulation Interface |
| | Turn Pool [39:7] | | |

U.S. PATENT DOCUMENTS

| | | | |
|---|---|---|---|
| 6,715,022 | B1 | 3/2004 | Ahern |
| 6,728,777 | B1 | 4/2004 | Lee et al. |
| 6,934,283 | B1 | 8/2005 | Warner |
| 6,940,814 | B1 | 9/2005 | Hoffman |
| 6,996,658 | B2 | 2/2006 | Brocco et al. |
| 7,043,541 | B1 * | 5/2006 | Bechtolsheim et al. ...... 709/223 |
| 7,062,581 | B2 | 6/2006 | Brocco et al. |
| 7,146,452 | B2 | 12/2006 | Brocco et al. |
| 2001/0025329 | A1 | 9/2001 | Sheikh et al. |
| 2002/0051445 | A1 | 5/2002 | Drottar et al. |
| 2002/0136202 | A1 * | 9/2002 | Droz et al. .................. 370/352 |
| 2003/0037199 | A1 | 2/2003 | Solomon et al. |
| 2004/0128410 | A1 | 7/2004 | Mayhew et al. |
| 2005/0078647 | A1 | 4/2005 | Meier et al. |
| 2005/0080976 | A1 | 4/2005 | Brocco et al. |
| 2005/0094568 | A1 | 5/2005 | Judd |
| 2005/0094630 | A1 | 5/2005 | Valdevit |

OTHER PUBLICATIONS

Response to Official Action issued in U.S. Appl. No. 10/945,633 dated Sep. 6, 2007, 50 pages filed Dec. 10, 2007.
Official Action issued in U.S. Appl. No. 10/945,633 dated Mar. 14, 2008, 8 pages.
Response to Official Action issued in U.S. Appl. No. 10/945,633 dated Mar. 14, 2008, 14 pages filed Jun. 9, 2008.
Advisory Action issued in U.S. Appl. No. 10/945,633 dated Jul. 2, 2008, 3 pages.
Response to Advisory Action issued in U.S. Appl. No. 10/945,633 dated Jul. 2, 2008, 5 pages filed Jul. 17, 2008.
Advisory Action issued in U.S. Appl. No. 10/945,633 dated Sep. 2, 2008, 3 pages.
Interview Summary issued in U.S. Appl. No. 10/945,633 dated Sep. 15, 2008, 1 page.
Official Action issued in U.S. Appl. No. 10/945,633 dated Sep. 15, 2008, 6 pages.
Amendment filed in U.S. Appl. No. 10/945,633 on Feb. 17, 2009, 8 pages.
Office Action of Sep. 15, 2008 in U.S. Appl. No. 10/945,633.
Response to Office Action of Sep. 15, 2008 in U.S. Appl. No. 10/945,633.
Final Office Action of May 26, 2009 in U.S. Appl. No. 10/945,633.
Response to Final Office Action of May 26, 2009 in U.S. Appl. No. 10/945,633.

* cited by examiner

FIG. 1

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Turn Pool [6:0] | | | | | | | | Bit Count [23-63] | | | | | | CT | BQ | Traffic Class | | | Credit Length | | | | | Protocol Encapsulation Interface | | | | | | | |
| Turn Pool [39:7] | | | | | | | | | | | | | | | | | | | | | | | | | | | | | | | |

FIG. 2

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Reserved | | | | | Hop Count(22-63) | | | | | | | | | | R | Traffic Class | | | Credit Length | | | | | Protocol Encapsulation Interface | | | | | | | |
| Multicast Group Index | | | | | | | | | | | | | | | | Multicast Source Index | | | | | | | | | | | | | | | |

FIG. 3

| 63 | 25 | 24 | 19 |
|---|---|---|---|
| Turn Pool | | Bit Count | |

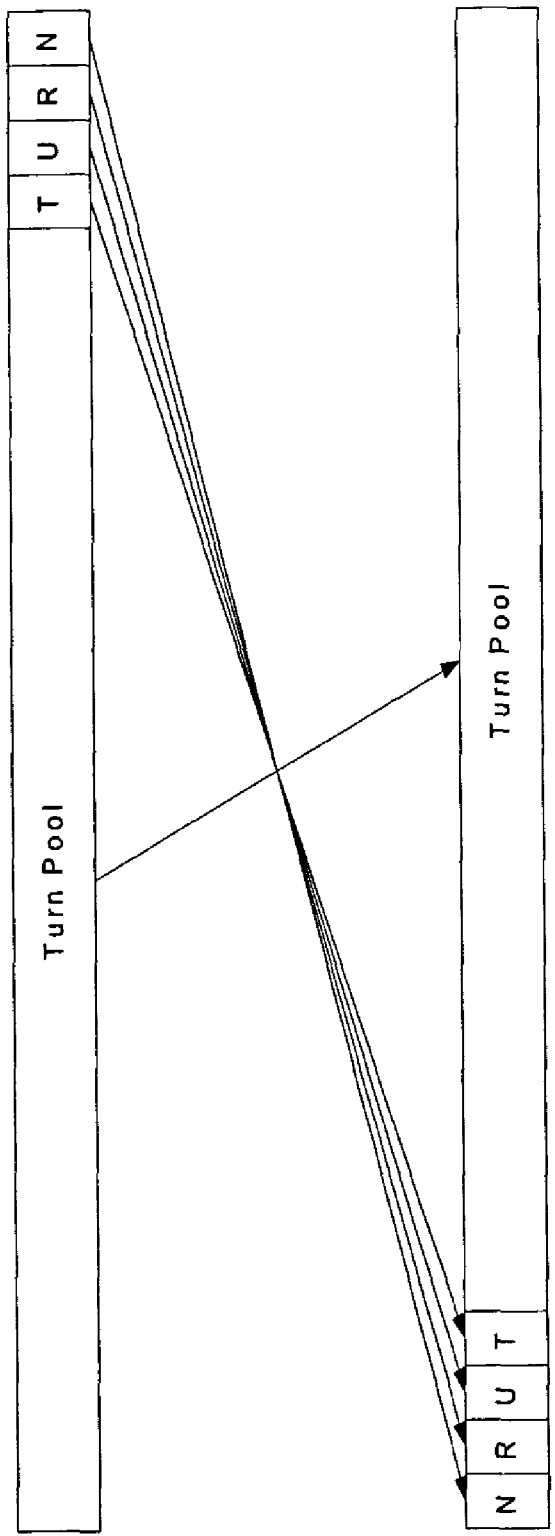

FIG. 6

| +0 (7:0) | +1 (7:0) | +2 (7:0) | +3 (7:0) |
|---|---|---|---|
| Turn Pool [6:0] | Bit Count [63-23] | Reserved / Credit Length = 1 | Protocol Encapsulation Interface = 0 |
| Turn Pool [38:7] | | | |
| Implementation Dependent Fields | | MTU | PID Index / Operation |
| EUI [31: 0] | | | |
| EUI [63:32] | | | |

FIG. 7

| +0 (7:0) | +1 (7:0) | +2 (7:0) | +3 (7:0) |
|---|---|---|---|
| Turn Pool [7:0] | RW / CT / Bit Count [22-63] | TC / 5 | Length |
| Turn Pool [39:8] | | | |
| offset [23:2] | | | C R C |
| Transaction # / 1 / Drop / Skip | Dwords Requested | Pipe Index | offset [39:32] / Type (0) |

FIG. 11

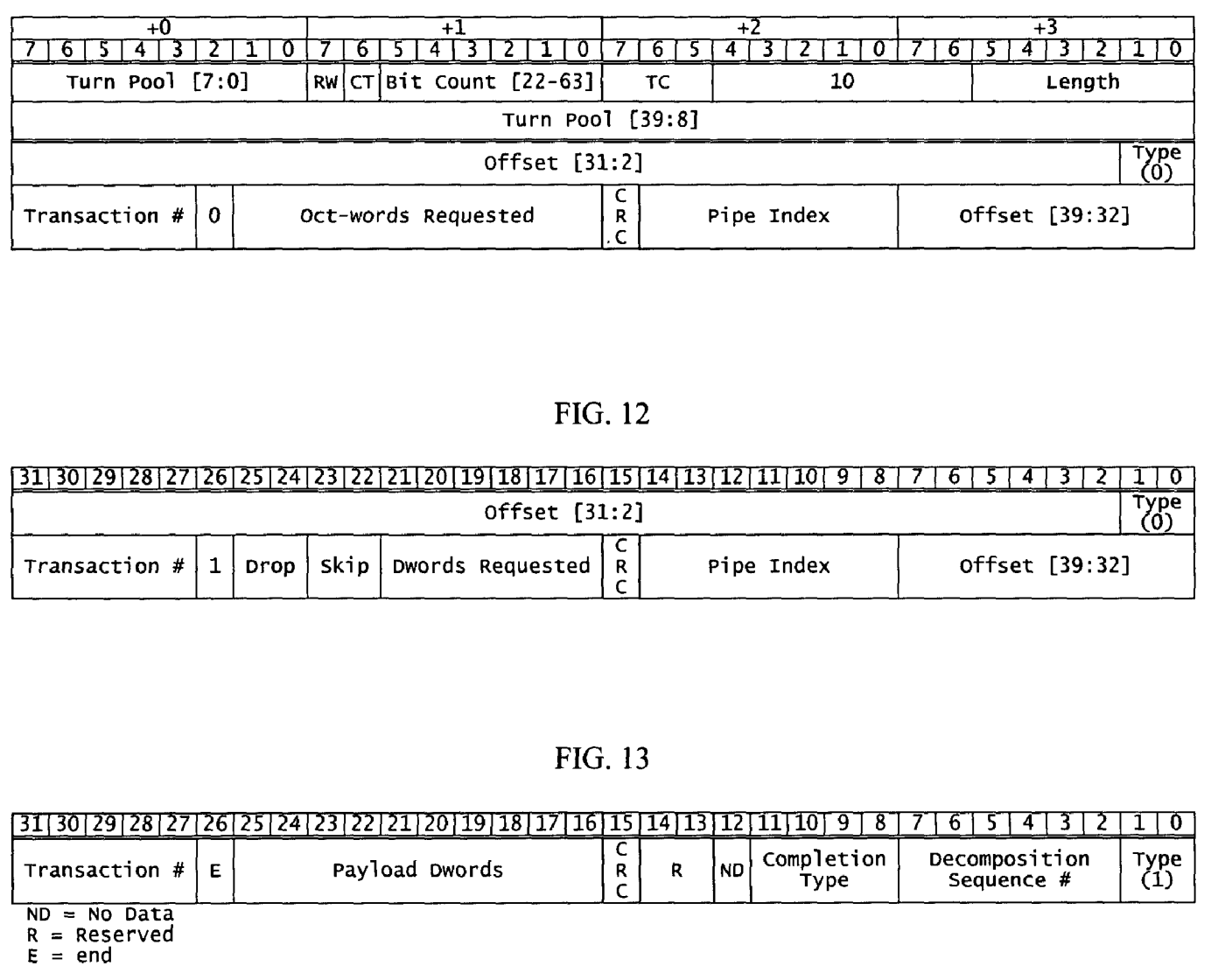

| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| +0 | | | | | | | | +1 | | | | | | | | +2 | | | | | | | | +3 | | | | | | | |
| Turn Pool [7:0] | | | | | | | | RW | CT | Bit Count [22-63] | | | | | | TC | | | | | | | | Length | | | | | | | |
| Turn Pool [39:8] | | | | | | | | | | | | | | | | | | | | | | | | | | | | | | | |
| offset [31:2] | | | | | | | | | | | | | | | | | | | | | | | | | | | | | | C R C | |
| Transaction # | | | | 0 | | | | Oct-words Requested | | | | | | | | Pipe Index | | | | | | | | offset [39:32] | | | | | | | Type (0) |

FIG. 12

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| offset [31:2] | | | | | | | | | | | | | | | | | | | | | | | | | | | | | | C R C | |
| Transaction # | | | | 1 | Drop | skip | | Dwords Requested | | | | | | | | Pipe Index | | | | | | | | offset [39:32] | | | | | | | Type (0) |

FIG. 13

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Payload Dwords | | | | | | | | | | | | | | | | C R C | | ND | R | | Completion Type | | | | Decomposition Sequence # | | | | | | |
| Transaction # | | | | E | | | | | | | | | | | | | | | | | | | | | | | | | | | Type (1) |

ND = No Data
R = Reserved
E = end

FIG. 14

| 31 30 29 28 27 | 26 25 24 23 22 21 20 19 18 17 16 15 14 13 12 11 10 9 8 | 7 6 5 4 3 2 | 1 | 0 |
|---|---|---|---|---|
| | offset [31:2] | | 1 | 0 |
| Transaction # | 0 | Payload Dwords | C R C | Pipe Index | offset [39:32] |

FIG. 15

| 31 30 29 28 27 | 26 25 | 24 23 22 21 20 19 18 17 16 15 14 13 12 11 10 9 8 | 7 6 5 4 3 | 2 | 1 0 |
|---|---|---|---|---|---|
| | | offset [31:2] | | | Type (2) |
| Transaction # | 1 Drop | Skip | Payload Dwords | C R C | Pipe Index | offset [39:32] |

FIG. 16

| 31 30 29 28 27 | 26 | 25 24 23 22 21 20 19 18 17 16 15 14 13 12 11 10 9 8 | 7 6 5 4 3 | 2 | 1 0 |
|---|---|---|---|---|---|
| Transaction # | 0 | E | Payload Quad-words | C R C | Pipe Index | Decomposition Sequence # | Type (3) |

FIG. 17

| 31 30 29 28 27 | 26 25 | 24 23 22 21 20 19 18 17 16 15 14 13 12 11 10 9 8 | 7 6 5 4 3 | 2 | 1 0 |
|---|---|---|---|---|---|
| Transaction # | 1 Drop | Payload Dwords | C R C | Pipe Index | Decomposition Sequence # | Type (3) |

ADVANCED SWITCHING ARCHITECTURE

CROSS-REFERENCE TO RELATED APPLICATIONS

This application claims the benefit of U.S. Provisional Patent Application No. 60/409,792 entitled "System and Method for Advanced Switching Architecture" and filed Sep. 11, 2002, which is incorporated by reference herein in its entirety.

BACKGROUND OF THE INVENTION

1. Field of the Invention

This invention generally relates to the field of networks, in particular, an extensible switching fabric framework for encapsulation of a protocol.

2. Description of the Related Art

Switch fabric networks are generally known to one skilled in the art. An example of one is described in U.S. patent application Ser. No. 10/152,656 filed May 21, 2002 which is incorporated by reference herein in its entirety.

In a computer system, the interconnection architecture of various components greatly affect the speed and cost of the system. The PCI standard (i.e., "Peripheral Component Interconnect"), was originally developed as a way to connect different peripherals to a computer.

Yet another architecture is PCI Express which is a serial interconnect architecture. PCI Express is also used in a switch fabric network architecture. The PCI Express standard retains the PCI usage and software interfaces thereby providing the ability to be compatible with legacy computers (such as a personal computer, "PC") hardware and software infrastructure. However, this limits the potential of the standard because of constraints from PC architectures retained from the 1980s. Accordingly, there is a need to address the limitations of the PCI Express standard and to provide a way to improve the flexibility and expandability of the PCI Express standard.

BRIEF SUMMARY OF THE INVENTION

The present invention is an advanced switching architecture that provides extensions to, preferably, the PCI Express standard, as further discussed below.

BRIEF DESCRIPTION OF THE DRAWINGS

The figures below depict various aspects and features of the present invention in accordance with the teachings herein.

FIGS. 1-3 and 5-17 depict different data formats for the protocol described herein.

FIG. 4 depicts the turn pool reversal in accordance with one aspect of the invention.

DETAILED DESCRIPTION OF THE INVENTION

Figure 8:
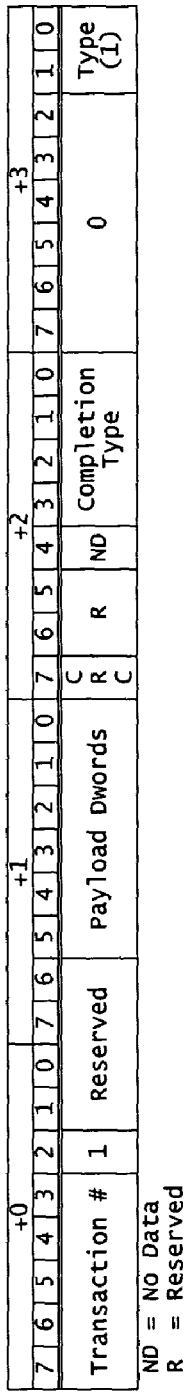

In accordance with one aspect of the present invention, the advanced switch ("AS") architecture, provides for an extensible switching fabric framework for encapsulation of virtually any protocol. Preferably, as applied to PCI Express, the PCI Express Advanced Switching (PCI "ExAS") architecture partitions protocol encapsulation into two distinct categories:

ExAS Routing; and

Protocol Encapsulation Interface, which is protocol specific.

1. ExAS Routing Header

In accordance with one aspect of the present invention, the separation of all routing associated information enables simple, high performance and cost effective switch designs that are agnostic to everything within the packet with the exception of what is needed to forward a packet towards the next hop within the fabric. The information that is contained within an ExAS route header includes:

Path routing information

Traffic Class ID

Congestion and Deadlock avoidance information

Packet Size

Protocol Encapsulation Interface specification a. Unicast Packet Format

A unicast packet is an encapsulation packet type. The unicast packet format is shown in FIG. 1 and further described in Table 1.

TABLE 1

| | | | | |
|---|---|---|---|---|
| Unicast Packet Field Description | | | | |
| Bit Positions | Bit field width | Hop Mutable | Field Name | Description |
| 7:0 | 8 | No | Protocol Encapsulation Interface | The interface field indicates the absolute packet type of the encapsulated packet (interfaces 0-191) or the implementation specific packet type of the encapsulated packet (interfaces 192-254). Interface 255 is reserved. |
| 13:8 | 6 | No | Credit Length | The credit length field does not specify the exact length of the associated encapsulated packet. Instead in indicates the amount of credit consumed by the encapsulated packet. The start and end commas of the link layer determine the exact length of the packet. ExAS packet credit is consumed in 32-byte blocks. The credit length field indicates the number of 32-byte blocks necessary to hold the ExAS header and encapsulated packet. For example, a packet that at the link layer consumes 68 bytes (1-byte start comma, 2 byte sequence number, 8-byte ExAS header, 52-byte encapsulated packet, 4-byte LCRC, 1-byte end comma), would require two 32-byte storage blocks (the encapsulated packet plus header occupy only 60-bytes). Similarly, an 80-byte link layer packet would require three 32-byte blocks (the encapsulated packet plus |

TABLE 1-continued

Unicast Packet Field Description

| Bit Positions | Bit field width | Hop Mutable | Field Name | Description |
|---|---|---|---|---|
| | | | | ExAS header consume 76 bytes, 4 more bytes than could be stored in only two 32-byte blocks). Bit 5 of the credit length field is the bias bit. When bit 5 is clear (0), the lower 5 bits of the field indicate the number of 32-byte blocks of storage required to forward the packet, from 0 to 31. A zero length packet indicates that there is no encapsulated packet present. When bit 5 is set, the lower 5 bits of the credit length field contain the number of 128-byte blocks (four 32-byte blocks) of storage consumed by the encapsulated packet plus 1024-bytes. The equation for determining the number of 32-byte credit blocks consumed by an ExAS packet's encapsulated packet is: blocks = (CL [5]) ? ((CL[4:0] + 8) << 2) : CL[4:0] |
| 16:14 | 3 | No | Traffic Class | This field indicates the priority of the packet. It is used by nodes to determine the order in which packets are forwarded or processed. |
| 17 | 1 | No | Bypass Queue | This flag is used purely for packet by-pass and flow-control crediting purposes. This bit indicates whether a given packet consumes posted/completion credit and is not by-passable (bit is clear), or whether the packet consumes non-posted credit and is bypassable (bit is set). This bit does not necessarily indicate anything about the type of the packet encapsulated by the ExAS header. Care should be taken to ensure that this bit is properly set when injecting packets into the fabric. Improper use of this bit can result in fabric deadlock. |
| 18 | 1 | Yes | Credit Type | This bit indicates whether the associated packet has been forwarded using next turn credit or traffic class credit. |
| 24:19 | 6 | Yes | Bit Count | This field indicates the current position of return path head within the turn pool. This field also differentiates a unicast packet from a multicast packet. Field values between 63 and 23 are interpreted as unicast packets. Packets that are received by switches with bit count values of 23 and 24 indicate that the packet has an invalid turn pool (software has improperly initialized whatever hardware structure set the packet's turn pool). Packets that are received by endpoints with bit count values of 23 indicate that the packet has an invalid turn pool. |
| 63:25 | 39 | Yes | Turn Pool | The turn pool contains the variable bit width turn values of a path specification. | b. Multicast Packet Format

A multicast packet is an encapsulated packet type. Multicast packets cannot use turn credit and always consume traffic class credit. Multicast packets are write only. There is no option for multicast packet bypass. The multicast packet format is shown in FIG. 2 and further described in Table 2.

TABLE 2

Multicast Packet Field Descriptions

| Bit Positions | Bit field width | Hop Mutable | Field Name | Description |
|---|---|---|---|---|
| 7:0 | 8 | No | Protocol Encapsulation Interface | The interface field indicates the absolute packet type of the encapsulated packet (interfaces 0-191) or the implementation specific packet type of the encapsulated packet (interfaces 192-254). Interface 255 is reserved. |
| 13:8 | 6 | No | Credit Length | The credit length field does not specify the exact length of the associated encapsulated packet. Instead in indicates the amount of credit consumed by the encapsulated packet. The start and end commas of the link layer determine the exact length of the packet. ExAS packet credit is consumed in 32-byte blocks. The credit length field indicates the number of 32-byte blocks necessary to hold the ExAS header and encapsulated packet. For example, a packet that at the link layer consumes 68 bytes (1-byte start comma, 2 byte sequence number, 8-byte ExAS header, 52-byte encapsulated packet, 4-byte LCRC, 1-byte end comma), would require two 32-byte storage blocks (the encapsulated packet plus header occupy only 60-bytes). Similarly, an 80-byte link layer packet would require three 32-byte blocks (the encapsulated packet plus ExAS header consume 76 bytes, 4 more bytes than could be stored in only two 32-byte blocks). |

TABLE 2-continued

Multicast Packet Field Descriptions

| Bit Positions | Bit field width | Hop Mutable | Field Name | Description |
|---|---|---|---|---|
| | | | | Bit 5 of the credit length field is the bias bit. When bit 5 is clear (0), the lower 5 bits of the field indicate the number of 32-byte blocks of storage required to forward the packet, from 0 to 31. A zero length packet indicates that there is no encapsulated packet present. When bit 5 is set, the lower 5 bits of the credit length field contain the number of 128-byte blocks (four 32-byte blocks) of storage consumed by the encapsulated packet plus 1024-bytes. The equation for determining the number of 32-byte credit blocks consumed by an ExAS packet's encapsulated packet is: blocks = (CL [5]) ? ((CL[4:0] + 8) << 2) : CL[4:0] |
| 16:14 | 3 | No | Traffic Class | This field indicates the priority of the packet. It is used by nodes to determine the order in which packets are forwarded or processed. |
| 18:17 | 2 | No | Reserved | |
| 24:19 | 6 | Yes | Hop Count | This field indicates the number of switch traversals the associated packet has undergone. This field also differentiates a unicast packet from a multicast packet. Field values between 0 and 22 are interpreted as unicast packets. Packets that are received by switches with a bit count values of 22 indicate that software has improperly initialized the associated multicast group. |
| 31:25 | 7 | No | Reserved | |
| 51:32 | 20 | No | Multicast Source Index | The multicast group manager assigns this field to an endpoint. It is optional from a routing perspective. That is, multicast distribution is unaffected by the value of this field, but it is strongly recommended that the multicast group manager provide every endpoint with a unique source index. |

2. Protocol Encapsulation Interface

The Protocol Encapsulation Interface ("PEI") allows for protocol encapsulations to include whatever else they need in a subsequent sub-header, or sub-headers, enabling the efficiencies of a modular approach to protocol encapsulation.

3. PCI Express-AS Packet Routing

The ExAS protocol supports two mechanisms for routing packets across an ExAS fabric: path routing (PR) and multicast routing (MR). Path routed packets rely on an explicit source supplied path for routing unicast packets between nodes. Multicast routing provides a true multicast capability for writing data across a fabric based on a table look-up at each node.

ExAS unicast packet routing is based on an origin and a terminus. The origin of a packet is the endpoint that generates the initial fabric transaction, and the terminus of a packet is the endpoint that ultimately receives the transaction. Endpoints do not forward/switch ExAS packets back into the ExAS fabric on which they arrived.

a. Path Routing

All ExAS nodes are required to support path routing. A path specifies the position of the terminus relative to the origin, and is assigned to the ExAS header by the origin of the packet. Nodes are required only to forward the packet according to the path that is contained in the ExAS packet header.

i. Path Specification

A path, as shown, for example, in FIGS. 1 and 3, consists of a bit count, and a turn pool. The bit count indicates the bit position in the quad-word ExAS header of the head of the backward path specification (explained momentarily). The turn pool is a container for turns. A turn pool logically contains two paths: a forward path and a backward path. The forward path indicates the path from a packets current fabric position to its destination. The backward path, via a transformation, indicates the path from a packets current fabric position back to the packet's origin. The bit count partitions the turn pool into its forward and backward components. The backward path of a packet when the packet is at its origin is null.

A turn is a variable sized, contiguous field containing one or more bits. The actual value of a turn is called its turn value. A turn value indicates the position of an output port relative to the input port on which a packet is received, and contains the number of relative ports to be skipped between the input port and the output port. An output port number is equal to ([input_port_number+turn_value+1] modulo $[2^{N}+1]$). For example, the turn value for a packet entering a switch on port x and leaving on port x+1 is 0, and the turn value for a packet entering port x and leaving port x+4 is 3.

The switches in an ExAS fabric can be classified by the number of bits, of turn pool they consumed. Logically each switch has $2^{N}+1$ ports, where N the number of bits of turn pool consumed by the switch. For example, a 3-bit switch logically has 9 ports, even if physically it only had 7 ports. From a relative routing perspective, port 0 follows port $2^N$, or a turn value of 0 in a packet that arrived on physical port $2^N$ would indicate that the packet should exit the switch on physical port 0. A switch cannot use more physical ports than its turn pool consumption indicates. For example a 4-bit switch can have at most 17 physical ports. Conversely, a switch could consume 5-bits of turn pool but only contain say 6 physical ports, though profligate consumption of turn pool bits is strongly discouraged. The sizes of the turns within a turn pool is determined by the switches that process the turn pool as it traverses a fabric. FIG. 3 shows the routing portion of a unicast header.

ii. Path Initialization

The origin of the packet is responsible for constructing the header of the packet, including the path. The method for assignment of paths and other packet header values to a packet by the origin is implementation specific.

The turn pool of an as yet unrouted packet can be partitioned into two sections: the active partition and the unused partition. The active partition of a path contains the bits that are processed by the switches between the packet's origin and its destination. The unused portion of the turn pool contains any additional bits remaining in the turn pool that are not required to route the packet to its destination. For example, a packet that is expected to traverse six 4-bit switches on its route from origin to terminus would have a 24-bit active partition and a 16 bit unused partition. It is possible that one of partition may be empty. For example a ten 4-bit switch path would require all 40 bits of the turn pool and the unused partition would be empty. Conversely, two ExAS endpoints that were directly connected would not traverse any switches and the active partition of the turn pool would be empty.

When an origin constructs a path, it must supply two values: the turn pool and the bit count. When routing packets to endpoints the bit count is always initialized to be zero. When routing packets to switches, the bit count must be biased. For a packet to be accepted by a switch its bit count must be 23 when it arrives at the switch. To ensure this necessary condition, an endpoint that wishes to communicate with a switch must set the initial bit count of switch based packets to be the 23 plus the bit size of the active turn pool partition.

The active partition of the turn pool must be initially right justified in the turn pool, with the unused partition filling the unused bits to the right of the active partition. The unused portion of an endpoint destined turn pool must set to all zeroes. The unused portion of an switch destined turn pool must set to all ones.

iii. Switch Path Transform

An N-bit switch, when it receives a path-routed packet, uses bits 25 through 24+N of the routing header (bits 0 through (N−1) of the turn pool) as the switches turn value. Before forwarding a path routed packet a switch must perform a switch path transform on the packet's path. A switch path transform consists of decrementing the packets bit count by N and shifting the turn pool N bits to the right, shifting in from the left the bit-reversed turn value used by the switch. For example, a 4-bit switch that received a packet with a turn pool value of 00 . . . 001001100100011b and a bit count of 63 would forward the packet with a turn pool value of 110000 . . . 00100110010b and a bit count of 59. If the next switch the aforementioned packet encountered consumed 8-bits of turn pool, the next transformed path would be 010011001100000 . . . 001b and the bit count would be 51.

The equations for switch based path transform are:

$X = BIT\_SIZE\_OF\_SWITCH$ $bit\_count = bit\_count - X$ $turn\_pool = turn\_pool[0:X-1], turn\_pool[38:X] // concatenate$ For example, the equations for a 4-bit switch path transform are:

$bit\_count = bit\_count - 4$ $turn\_pool = turn\_pool[0:3], turn\_pool[38:4] // concatenate$ FIG. 4 shows the mapping of a path routing turn pool field reversal.

The output port used by the origin of a packet is not a part of the packet's path, nor is the bit count decremented when it leaves its origin. The method for assignment of the output port of a packet at the origin is implementation specific.

iv. Endpoint Path Transform

A path from an origin to a terminus can be translated to provide a path from the terminus back to the origin. This translation, or path transform, requires that bit count be set to zero and the turn pool be inverted and bit reversed. For example, if a packet arrived at an endpoint with a turn pool of 0111111111100000000000000000000000011110b, then the transformed path would be 10001111111111111111111111111100000000001b band the bit count would be 0.

When a path transform is applied to the blind broadcast path identifier received during fabric enumeration, the result is a path to the root. This path to the root is used for event packets when the event tables are not programmed. Switches must independently record the input port in which a packet arrives if they wish to be able to perform a path transformation and return the packet, or trace its path back to its origin. The input port on a component is not captured within the path and must be maintained separately.

The terminus of a packet addressed by a transformed path as described above must be an endpoint.

b. Path Routing Errors

If a path is programmed incorrectly or if a port along the path is down, a path routed packet can encounter an error that prevents it from being forwarded any further. The following are path routed errors that must be detected by switches:

Bad Path: bit count=24 at a switch. If a packet is received that has a bit count of 24, and is NOT an Interface 1 packet, then the packet must be discarded as it is assumed that the path is bad. This prevents packets from circulating endlessly within the fabric. The switch drops the packet (crediting the packet in the process) and generates a Path Event packet to the origin of the packet.

Port Down. A packet cannot be forwarded because the output port is down. The switch drops the packet, and generates a Path Event to the origin.

Bad Turn Value: Port number is not mapped to a physical link at the node. Treated the same way as a Port Down described above.

When a path-routed error occurs, path events are generated for path routed packets. Path events are not generated for multicast packets. Multicast packets result in a multicast distribution error being sent to the multicast event host. A path event is sent back to the origin of a packet, and allows the origin to invalidate that path for use until it is repaired. Path events are discussed in more detail in Section.

c. Multicast Routing

Multicast routing enables a single packet generated by an origin to be sent to multiple endpoints. Duplicate packets are generated only when the paths of the multicast packet diverge. From the ExAS perspective, multicast packets are restricted to writes; there is no such thing as a multicast read. A multicast packet is identified when a packet is received with a hop/bit count of 0-22.

Multicast packets are routed from node to node based on table look-ups at each switch. Each multicast packet has a Multicast Group Index, which identifies the multicast group to which the packet belongs. This 12-bit Multicast ID occupies bits 63-48 of the ExAS routing header. The bit count field of the unicast header is recast as a hop count field for multicast headers. A multicast distribution tree is limited to 22 switch traversals (hops). When a multicast packet is received at a switch, its hop count field (bits 24-19 of the ExAS routing header) is tested. If the hop count is 22, then a multicast routing error has occurred. If the hop count is 21 or less, then the hop count is incremented and the packet is forwarded.

Multicast routing is optional in ExAS. Multicast support is different for endpoints and switches. Endpoint support for multicast only requires the ability to inject multicast packets into a fabric. For a switch, multicast requires the implementation of a multicast routing table and multicast packet distribution mechanisms. Optional multicast support extends to the number of multicast groups supported by a switch. A switch's capability list structure includes a structure that specifies the number of multicast groups a switch supports. Endpoint capability lists include only a single bit that indicates whether multicast traffic is supported. For an endpoint, multicast support is all or nothing. Endpoints that support multicast must support all 4096 possible multicast groups.

ExAS supports a multicast routing model in which an endpoint can be a target of a multicast group a source of a multicast group, or both. That is, an endpoint can write into a multicast group to which it does not listen, listen to a group into which it does not write, or both write and listen. From the group perspective, a group can have a single writer or multiple writers and a single listener or multiple listeners.

Multicast distribution is switch port based. ExAS switches contain an array of multicast distribution vectors. A multicast distribution vector contains a pair of bits per switch port. These bits are the get and put bits. If the get bit for a given port is set, then that port is allowed to forward packets of the associated multicast group. If the get bit for a given port is not set, then receipt of a multicast packet on that port results in the packet being discarded and the generation is a multicast distribution error. When a valid multicast packet arrives at a switch, the put bits are used to determine on which ports the packet will exit. The port on which a packet arrives is excluded from the forwarding vector. If a packet arrives at a switch that has a null forwarding vector, then the packet is discarded and a multicast distribution error is generated.

A multicast manager configures multicast. A fabric's multicast manager is responsible for manipulating the multicast tables of a fabric's switches in a way that maintains a logically consistent view of multicast distribution.

A switch that receives a packet with a multicast group index larger than the switches set of supported multicast groups discards the packet and generates a multicast distribution error. A switch that does not support multicast is logically identical to a switch that supports 0 multicast groups.

There are no special routing requirements on terminal endpoints for multicast packets; they are received and processed as if they were unicast packets, with the caveat that path transform is not an option.

i. Generating Multicast Packets at an Endpoint

Generation of multicast packets at an endpoint is optional. The method for assignment of multicast groups and other header fields in an endpoint is implementation specific.

ii. Sending and Receiving Multicast Packets

When a switch receives a multicast packet, it must use the Multicast Group Index as an index into a Multicast Table to select a multicast group entry. The Multicast Table has an entry for each multicast group supported. The size of a multicast table entry is switch port size specific. The number of supported multicast groups is implementation specific, although a minimum recommended number for a switch is 32 (Multicast groups 0 through 31).

Each Multicast Table entry has the following format as depicted in FIG. 5, where N is the number of ports on the switch.

The multicast packets may be sent independently out each port. Credits and ordering are checked for each outgoing multicast packet independently of any other copies of the packet that may be sent out other ports. If a transmission error occurs when one of the multicast packets is sent, only that copy for the affected port is re-transmitted.

Note that a single multicast packet can result in the generation of many packets within the fabric. A switch may generate up to $2^N$ multicast packets (where N is the bit number of the switch) for each multicast packet it receives. Applications need to be aware of this characteristic of multicast traffic and plan bandwidth usage accordingly.

iii. Multicast Routing Failures

There are several checks that a multicast packet must undergo in a switch before it can be forwarded, as summarized in Table 3. If a check fails, the multicast packet is discarded and an event is signaled. If multiple errors occur, the Failure Type used is listed from highest to lowest priority in the table. Multiple events may be set. Table 3 shows the different types of routing checks.

TABLE 3

Multicast Routing Checks

| Multicast Check | Chip Event | Failure Type |
| --- | --- | --- |
| Hop count = 22 | S/W Multicast Distribution Failure | Software Routing Failure |
| Unsupported Multicast ID | Unsupported Multicast Group ID | Software Routing Failure |
| Input port mismatch (protected groups only) | S/W Multicast Distribution Failure | Software Routing Failure |
| Output port(s) down | H/W Multicast Distribution Failure | N/A |
| No members in group | S/W Multicast Distribution Failure | Software Routing Failure |

The "Hop Count=22" failure means that the multicast write packet had a bit count set to the maximum value of 22 when entering a switch. Unlike a path-routed packet, a multicast packet that enters a switch with an erroneous bit/hop count does not cause a path event to be generated, however the multicast packet is discarded.

Unsupported Multicast ID means that the multicast write had a Multicast ID which does not have a corresponding entry in that switch's Multicast Table. For instance, a switch implements entries for multicast groups 0 through 31, but a multicast packet is received with a Multicast ID of 54.

If one or more of the output ports of a multicast group are down, the multicast packet is forwarded to the operational output ports that are group members.

4. Protocol Encapsulation Interfaces

The PCI Express-AS specification several PEIs for ExAS architecture. They are detailed in the following sections.

0—Enumeration
    1—Device Management
        Multiple apertures
        Partitioned by access rights
        Fabric master, device host, bus driver, operating system
        Specification defined registers vs. device specific registers
    2—Event reporting
    3-7—ExAS Fabric Management Reserved
    8—PCI Express Core protocol
    9—PCI Express MsgAS protocol
    10—Simple Data Protocol
    11-191—PCI-SIG defined interfaces
    192-254—User defined interfaces
    255—Reserved (Invalid)
    a. Interface 0—Enumeration (Blind Broadcast)

Interface 0, blind broadcast, is a required interface that uses exactly one packet format, the blind broadcast packet. Any packet directed to interface 0 of a component will be interpreted as a blind broadcast packet. FIG. 6 shows the format of a blind broadcast packet and Table 4 describes it in further detail.

TABLE 4

Blind Broadcast Packet Field Descriptions

| Bit Positions | Bit field width | Hop Mutable | Field Name | Description |
|---|---|---|---|---|
| 7:0 | 8 | No | Protocol Encapsulation Interface | This field identifies the packet as a blind broadcast packet. All packets routed using PEI 0 are interpreted as blind broadcasts. |
| 13:8 | 6 | No | Credit Length | The credit length of a blind broadcast packet is 1. Any value other than 0 is a malformed packet. |
| 18:14 | 5 | No | Reserved | |
| 24:19 | 6 | Yes | Bit Count | This field indicates the number of switch traversals the associated packet has undergone. Packets that are received by switches with a bit count values of 23 or less, or at s endpoints with a bit count value of 22 or less indicate that the receiving node has been pruned. |
| 63:25 | 39 | Yes | Turn Pool | The turn pool contains the variable bit width turn values of a path specification. |
| 67:64 | 4 | No | Operation | This field indicates the type of blind broadcast operation being performed. Operations are coded as follows:<br>0 = Reset<br>1 = Announce<br>2 = Own<br>3 = Re-Own<br>4-15 = Reserved |
| 71:68 | 4 | No | PID Index | This field indicates upon which of a node's PIDs the associated operation is to be performed. A node that does not implement a packet's indicated PID silently discards the blind broadcast packet. |
| 74:72 | 3 | No | MTU | Accepted PID 0 blind broadcast packets set the receiving node's maximum transmission unit (MTU). Nominal MTU values are defined as follows:<br>0 = 256<br>1 = 512<br>2 = 1024<br>3 = 2048<br>4 = 4096<br>5-7 = Reserved<br>Actual MTU values are the nominal value plus 64. The additional 64 bytes of MTU are a "fudge factor" added to the nominal value to account for the difference between an encapsulated packet's payload and the ExAS header and encapsulated packet's header overhead. |
| 95:73 | 22 | No | Implementation Dependent Fields | The bits in this field can be used by implementations to distribute instance specific data as part of a blind broadcast packet. |
| 159:96 | 64 | No | EUI | This field contains the NEUI of the origin of the blind broadcast packet. |

In accordance with one embodiment of the present invention, there are 16 types of blind broadcast packets, only 4 of which are defined in revision 1 of the current ExAS specification. The remaining unspecified blind broadcast packet types are reserved in revision 1.

b. Interface 1—Node Configuration and Status

Interface 1, node configuration and status, is a required, encapsulation interface (it is a transport for another packet type) built using a restricted implementation of interface 6 (the simple data protocol (SDP) interface). Interface 0 SDP packet usage is limited to the 64-byte maximum data payload versions of the read and write packets. Interface 0 implements at least two pipes, pipe 0 and 1. Pipe 0 is the capability space pipe. It logically corresponds to the capability list structures of legacy PCI devices. Pipe 1 is the register space pipe. It logically corresponds to the registers of legacy PCI.

There are three packet types accepted by interface 1: a read packet a completion packet and a write packet. All three packet types are restricted to 64 dword packet payloads.

i. Interface 1 Read Request Packet

Simple Read Data Packet Format with Unicast Header Prepended for Purposes of Clarity is shown in FIG. 7 and further described in Table 5.

TABLE 5

SDP Read Packet Field Descriptions

| Bit Positions | Bit field width | Field Name | Description |
|---|---|---|---|
| 1:0 | 2 | Type | This field indicates the type of the associated SDP packet. The possible types are:<br>0 = Read Request<br>1 = Read Completion |

TABLE 5-continued

SDP Read Packet Field Descriptions

| Bit Positions | Bit field width | Field Name | Description |
|---|---|---|---|
| | | | 2 = Write |
| | | | 3 = Reserved |
| 31:2 | 30 | Offset | This field provides the offset of the desired data relative to the associated pipe index. |
| 39:32 | 8 | Reserved | |
| 46:40 | 7 | Pipe Index | This field indicates the pipe index for the access. Interface 1 supports 4 pipes (0-3) Pipe 0 contians the Configuration List. Pipe 1 contains the Register Space. Pipe 2 references an ancillary memory space. Pipe 3 references a read with side effects register space. Pipes 4-127 are reserved. Any interface 1 packet that arrives with a pipe number larger than 3 results in a pipe access error. |
| 47 | 1 | CRC | This bit indicates whether the associated packet is protected by a CRC-32 value. When set, there is an additional dword of CRC appended to the packet. When clear, the packet ends immediately after the 8-byte header. There is no mechanism for requesting CRC on the response packet. The configuration of the read target will independently attach CRC to its completion packet, though implementations are free to use the use of CRC on a request to indicate that CRC should be appended to the completion. |
| 53:48 | 6 | Dwords Requested | This field indicated the number of dwords, whether partial or complete being requested by the associated read request. Interface 1 data requests are always dword aligned. The skip and drop fields are used to provide sub-dword access. The dword field indicates the number of dwords more than one requested. There is no option for a null completion payload. A request must request at least one dword. That dword may be masked such that no valid data is returned, but even in the event of a completely masked dword being returned, a dword is returned. Thus a dword field value of 0 indicates that 1 dword is being requested and a dwords field containing the value 63 indicates that 64 dwords are being requested. |
| 55:54 | 2 | Skip | This field indicates the number of bytes in the initial dword that are to be masked (disabled). The possible values indicate the following:<br>0 = No bytes masked<br>1 = Least significant byte of dword masked<br>2 = Least significant 2 bytes of dword masked<br>3 = Least significant 3 bytes of dword masked<br>If a single dword is being requested, then the skip and drop fields reference the same dword. In this case, the logical "or" of the skip and drop masks are applied to the dword request. |
| 57:56 | 2 | Drop | This field indicates the number of bytes in the final dword that are to be masked (disabled). The possible values indicate the following:<br>0 = No bytes masked<br>1 = Most significant byte of dword masked<br>2 = Most significant 2 bytes of dword masked<br>3 = Most significant 3 bytes of dword masked<br>If a single dword is being requested, then the skip and drop fields reference the same dword. In this case, the logical "or" of the skip and drop masks are applied to the dword request. |
| 58 | 1 | Request Type | Must be set. A packet format error will be generated if this bit is not set. |
| 63:59 | 5 | Transaction Number | This field indicated the source (requester) specific identifier for the request. This field is used to match requests with responses. The source of a read request may apply values to this field in any manner deemed appropriate. It is the responsibility of the terminus of a read request to return the completion data in a packet with a matching transaction number. | ii. Interface 1 Completion Packets

Completions shall not be decomposed into decomposition completion sequences. An endpoint making, for example, a 64-dword request must be capable of receiving the entire response in a single 64-dword payload completion, and a node receiving a 64-dword request, must return all 64-dwords in a single packet. FIG. 8 depicts the format of an interface 1 completion data packet, which is more fully described in Table 6.

TABLE 6

SDP Completion Packet Field Descriptions

| Bit Positions | Bit field width | Field Name | Description |
|---|---|---|---|
| 1:0 | 2 | Type | This field indicates the type of the associated SDP packet. The possible types are:<br>0 = Read Request<br>1 = Completion<br>2 = Write<br>3 = Reserved |
| 7:2 | 6 | Sequence Number | This field must be 0. |
| 11:8 | 4 | Completion Type | This field indicates the nature of the completion. When non-zero this field indicates that an error was encountered that terminated the request prematurely. The encoding for this field are as follows:<br>0 = Successful Completion<br>1 = Time Out<br>2 = Pipe Range Error<br>3 = Pipe Protection Error<br>4 = Access Error<br>5-15 = Reserved |
| 12 | 1 | No Data | This bit indicates that there is no partial data being returned in association with a request failure. If this bit is set, then the Dwords field logically becomes −1. If the bit is not set and the completion type is non-zero, then the dwords field contains a number of dwords that is less than the number of dwords in the associated read request. After the first dword, which is covered by the skip field of the request, all subsequent dwords for a partial completion must be whole dwords. If a data request fails mid dword, then the dword in which the failure occurs is not returned with any other partial completion dwords. |
| 14:13 | 2 | Reserved | |
| 15 | 1 | CRC | This bit indicates whether the associated packet is protected by a CRC-32 value. When set, there is an additional dword of CRC appended to the packet. When clear, the packet ends immediately after the last indicated dword. The interface 1 header's dword size field does not include the CRC dword when present. |
| 21:16 | 6 | Payload Dwords | This field indicated the number of dwords, whether partial or complete encompassed by the packet's payload. Interface 1 data requests are always dword aligned. Completions always return dword aligned payloads. If the request applied masks to the payload within the request, it is the duty of the requesting endpoint to "remember" the masks it supplied when requesting the data and to apply those masks again before using the data. The dword field indicates the number of dwords more than one requested. There is no option for a null completion payload. A request must request at least one dword. That dword may have been masked such that no valid data exists in the single dword payload returned. A dword field value of 0 indicates the presence of a 1-dword payload and a dwords field containing the value 63 indicates the presence of a 64-dword payload. |
| 25:22 | 4 | Reserved | |
| 26 | 1 | End | Must be set. A packet format error will be generated if this bit is not set. |
| 31:27 | 5 | Transaction Number | This field indicated the source (requester) specific identifier for the request. The transaction number of a request must exactly match the transaction number present in the associated request packet. | iii. Interface 1 Write Packets

Figure 9:
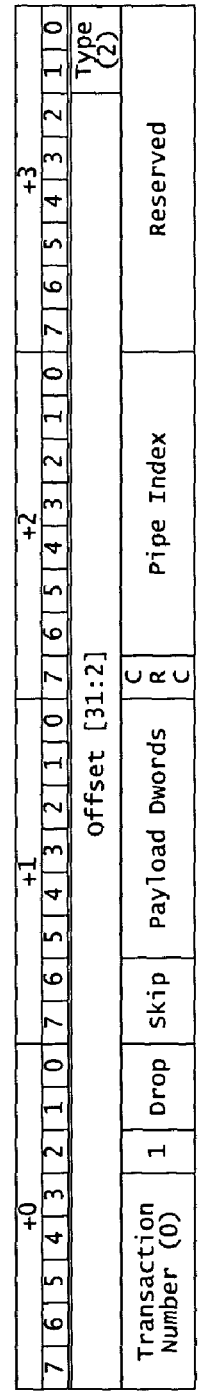

FIG. 9 shows the format of an interface 1 write data packet, which is more fully described in Table 7.

TABLE 7

SDP Write Packet Field Descriptions

| Bit Positions | Bit field width | Field Name | Description |
|---|---|---|---|
| 1:0 | 2 | Type | This field indicates the type of the associated SDP packet. The possible types are: |

TABLE 7-continued

SDP Write Packet Field Descriptions

| Bit Positions | Bit field width | Field Name | Description |
|---|---|---|---|
| | | | 0 = Read Request<br>1 = Read Completion<br>2 = Write<br>3 = Reserved |
| 31:2 | 30 | Offset | This field provides the offset of the associated data payload relative to the associated pipe index. |
| 39:32 | 8 | Reserved | |
| 46:40 | 7 | Pipe Index | This field indicates the pipe index for the access. Interface 1 supports 4 pipes (0-3) Pipe 0 contains the Configuration List. Pipe 1 contains the Register Space. Pipe 2 references an ancillary memory space. Pipe 3 references a read with side effects register space. Pipes 4-127 are reserved. Any interface 1 packet that arrives with a pipe number larger than 3 results in a pipe access error. |
| 47 | 1 | CRC | This bit indicates whether the associated packet is protected by a CRC-32 value. When set, there is an additional dword of CRC appended to the packet's payload. When clear, the encapsulated packet ends immediately after the payload. |
| 53:48 | 6 | Payload Dwords | This field indicated the number of dwords, whether partial or complete being transferred. Interface 1 data writes are always dword aligned. The skip and drop fields are used to provide sub-dword access. The dword field indicates the number of dwords more than one being written. There is no option for a null write payload. A write must supply at least one dword of payload. That dword may be masked such that no valid data is being presented, but even in the event of a completely masked dword being written, a dword is present. Thus a dword field value of 0 indicates that 1 dword is being written and a dwords field containing the value 63 indicates that 64 dwords are being written. |
| 55:54 | 2 | Skip | This field indicates the number of bytes in the initial dword that are to be masked (disabled). The possible values indicate the following:<br>0 = No bytes masked<br>1 = Least significant byte of dword masked<br>2 = Least significant 2 bytes of dword masked<br>3 = Least significant 3 bytes of dword masked<br>If a single dword is being written, then the skip and drop fields reference the same dword. In this case, the logical "or" of the skip and drop masks are applied to the dword being written. |
| 57:56 | 2 | Drop | This field indicates the number of bytes in the final dword that are to be masked (disabled). The possible values indicate the following:<br>0 = No bytes masked<br>1 = Most significant byte of dword masked<br>2 = Most significant 2 bytes of dword masked<br>3 = Most significant 3 bytes of dword masked<br>If a single dword is being written, then the skip and drop fields reference the same dword. In this case, the logical "or" of the skip and drop masks are applied to the dword being written. |
| 58 | 1 | Write Type | Must be set. A packet format error will be generated if a type 2 packet is received with this bit is not set. |
| 63:59 | 5 | Transaction Number | Must be zero. A packet format error will be generated if a type 2 packet is received with this field set to a non-zero value. | c. Interface 2—Event Notification

Figure 10:
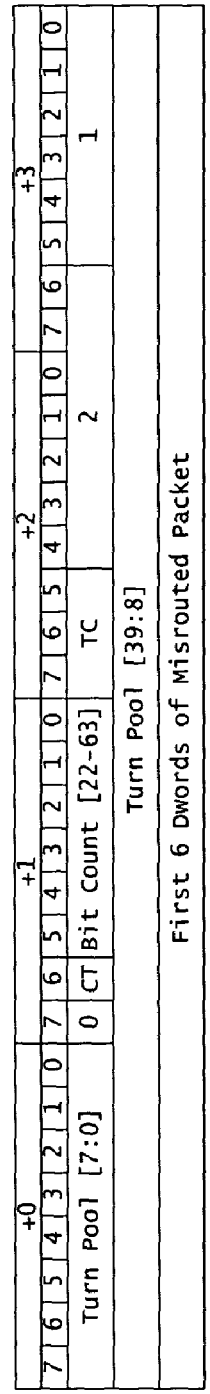

Interface 2, event notification, is an optional interface that uses exactly one packet format, the event notification packet. Any packet directed to interface 2 of a component will be interpreted as an event notification packet. For instance, a routing error packet format is shown in FIG. 10.

d. Interface 8—PCI-Express Core (ExC)

Interface 8, ExC, is an optional encapsulation interface targeting the extension of the ExC packet structure to ExAS. Both unicast and multicast ExAS packet formats may be used to tunnel ExC packets. The mechanism used to create an ExAS header for an ExC packet is implementation dependent. The ExC packet encodings for ExAS packets are ignored by ExAS proper (as is the content of all packets formats/protocols tunneled through ExAS), though it is reasonable to expect that the implementation specific ExAS header creation logic may have a significant interest therein.

e. Interface 10—Simple Data Protocol (SDP)

Interface 10, SDP, is an optional encapsulation interface targeting the extension of a simple memory like data movement protocol to ExAS. Both unicast and multicast ExAS packet formats may be used to tunnel SDP packets. SDP is a much simpler protocol than PCI-Express Core, and it targeted at simple partitioned memory space access between peer ExAS nodes.

i. SDP Pipes

SDP is pipe based. A pipe is a memory aperture. A pipe has an associated base address and size. The nature of the base address and size are implementation specific. A pipe also has a path protection capability. Each pipe has it own independent pair of path protection registers. Neither, one, or both of these path protection registers may be enabled. If neither of the path protection registers are enabled, then the pipe allows promis cuous access to its memory aperture. If one path protection register is enabled, then only packets with the matching path are allowed to access the associated aperture. If both path protection registers are enabled, then packets from either path are provided access. If path protection is enabled, then any packet arriving from a non-matching fabric location is rejected and a pipe protection event is generated.

ii. SDP Packet Formats

A. SDP Read Request Packets

FIG. 11 shows an example of a simple read data packet format with ExAS Routing Header Attached shown for purposes of clarity. FIG. 12 shows a simple read data packet format. The simple read data packet format is further described in Table 8.

TABLE 8

SDP Read Packet Field Descriptions

| Bit Positions | Bit field width | Field Name | Description |
|---|---|---|---|
| 1:0 | 2 | Type | This field indicates the type of the associated SDP packet. The possible types are:<br>0 = Read Request<br>1 = Read Completion<br>2 = Write<br>3 = Reserved |
| 39:2 | 38 | Offset | This field provides the offset of the desired data relative to the associated pipe index. |
| 46:40 | 7 | Pipe Index | This field indicates the pipe index for the access. |
| 47 | 1 | CRC | This bit indicates whether the associated packet is protected by a CRC-32 value. When set, there is an additional dword of CRC appended to the packet. When clear, the packet ends immediately after the 8-byte header. There is no mechanism for requesting CRC on the response packet. The configuration of the read target will independently attach CRC to its completion packet, though implementations are free to use the use of CRC on a request to indicate that CRC should be appended to the completion. |
| 53:48 | 6 | Dwords Requested | This field indicated the number of dwords, whether partial or complete being requested by the associated read request. Interface 1 data requests are always dword aligned. The skip and drop fields are used to provide sub-dword access. The dword field indicates the number of dwords more than one requested. There is no option for a null completion payload. A request must request at least one dword. That dword may be masked such that no valid data is returned, but even in the event of a completely masked dword being returned, a dword is returned. Thus a dword field value of 0 indicates that 1 dword is being requested and a dwords field containing the value 63 indicates that 64 dwords are being requested. |
| 55:54 | 2 | Skip | This field indicates the number of bytes in the initial dword that are to be masked (disabled). The possible values indicate the following:<br>0 = No bytes masked<br>1 = Least significant byte of dword masked<br>2 = Least significant 2 bytes of dword masked<br>3 = Least significant 3 bytes of dword masked<br>If a single dword is being requested, then the skip and drop fields reference the same dword. In this case, the logical "or" of the skip and drop masks are applied to the dword request. |
| 57:56 | 2 | Drop | This field indicates the number of bytes in the final dword that are to be masked (disabled). The possible values indicate the following:<br>0 = No bytes masked<br>1 = Most significant byte of dword masked<br>2 = Most significant 2 bytes of dword masked<br>3 = Most significant 3 bytes of dword masked<br>If a single dword is being requested, then the skip and drop fields reference the same dword. In this case, the logical "or" of the skip and drop masks are applied to the dword request. |
| 58 | 1 | Request Type | This bit, when set, indicates whether the associated packet's bits 57:48 contain a 2-bit skip, 2-bit drop and 6-bit dwords requested fields or a 10 bit octword (16-byte) aligned octwords requested field. |
| 63:59 | 5 | Transaction Number | This field indicated the source (requester) specific identifier for the request. This field is used to match requests with responses. The source of a read request may apply values to this field in any manner deemed appropriate. It is the responsibility of the terminus of a read request to return the completion data in a packet with a matching transaction number. |

B. SDP Completion Packets

FIG. 13 shows a simple completion data packet format, which is further described in Table 9.

TABLE 9

SDP Read Completion Packet Field Descriptions

| Bit Positions | Bit field width | Field Name | Description |
|---|---|---|---|
| 1:0 | 2 | Type | This field indicates the type of the associated SDP packet. The possible types are:<br>0 = Read Request<br>1 = Completion<br>2 = Write<br>3 = Reserved |
| 7:2 | 6 | Decomposition Sequence Number | A request that is larger than a single fabric MTU needs to be decomposed into a series of completion frames. This field indicates the absolute decomposition sequence number of a packet. A packet with a decomposition sequence number of 0 and its end bit set indicates that the packet contains all the requested data, or that an error occurred and no additional data will be forth coming. |
| 11:8 | 4 | Completion Type | This field indicates the nature of the completion. When non-zero this field indicates that an error was encountered that terminated the request prematurely. The encoding for this field are as follows:<br>0 = Successful Completion<br>1 = Time Out<br>2 = Pipe Range Error<br>3 = Pipe Protection Error<br>4 = Access Error<br>5-15 = Reserved<br>If the completion type is non-zero then the packet's end bit must also be set. |
| 12 | 1 | No Data | This bit indicates that there is no partial data being returned in association with a request failure. If this bit is set, then the Dwords field logically becomes −1. If the bit is not set and the completion type is non-zero, then the dwords field contains a number of dwords that is less than the number of dwords in the associated read request. After the first dword, which is covered by the skip field of the request, all subsequent dwords for a partial completion must be whole dwords. If a data request fails mid dword, then the dword in which the failure occurs is not returned with any other partial completion dwords. |
| 14:13 | 2 | Reserved | |
| 15 | 1 | CRC | This bit indicates whether the associated packet is protected by a CRC-32 value. When set, there is an additional dword of CRC appended to the packet. When clear, the packet ends immediately after the last indicated dword. Interface 10 header's dword size field does not include the CRC dword when present. |
| 25:16 | 10 | Payload Dwords | This field indicated the number of dwords, whether partial or complete encompassed by the packet's payload. Interface 1 data requests are always dword aligned. Completions always return dword-aligned payloads. If the request applied masks to the payload within the request, it is the duty of the requesting endpoint to "remember" the masks it supplied when requesting the data and to apply those masks again before using the data. The dword field indicates the number of dwords more than one requested. There is no option for a null completion payload. A request must request at least one dword. That dword may have been masked such that no valid data exists in the single dword payload returned. A dword field value of 0 indicates the presence of a 1-dword payload and a dwords field containing the value 63 indicates the presence of a 64-dword payload. |
| 26 | 1 | End | This bit, when set, indicates that this is the final packet in a decomposition sequence. That is, that the request has been fully satisfied, or has terminated in an error. |
| 31:27 | 5 | Transaction Number | This field indicated the source (requester) specific identifier for the request. The transaction number of a request must exactly match the transaction number present in the associated request packet. |

C. SDP Write Packets

FIGS. 14 and 15 show exemplary simple write data packet formats, further described in Table 10.

TABLE 10

SDP Write Packet Field Descriptions

| Bit Positions | Bit field width | Field Name | Description |
|---|---|---|---|
| 1:0 | 2 | Type | This field indicates the type of the associated SDP packet. The possible types are:<br>0 = Read Request<br>1 = Read Completion<br>2 = Write<br>3 = Sequenced Write |
| 39:2 | 38 | Offset | This field provides the offset of the associated data payload relative to the associated pipe index. |
| 46:40 | 7 | Pipe Index | This field indicates the pipe index for the access. |
| 47 | 1 | CRC | This bit indicates whether the associated packet is protected by a CRC-32 value. When set, there is an additional dword of CRC appended to the packet's payload. When clear, the encapsulated packet ends immediately after the payload. |
| 57:48 or 53:48 | 10 or 6 | Payload Dwords | If write type = 0, then this field indicates the number of dword aligned dwords in the packet's payload. All bytes in the payload are valid.<br>If Write Type = 1, then this field indicates the number of dwords, whether partial or complete being transferred. Interface 1 data writes are always dword aligned. The skip and drop fields are used to provide sub-dword access. The dword field indicates the number of dwords more than one being written. There is no option for a null write payload. A write must supply at least one dword of payload. That dword may be masked such that no valid data is being presented, but even in the event of a completely masked dword being written, a dword is present. Thus a dword field value of 0 indicates that 1 dword is being written and a dwords field containing the value 63 indicates that 64 dwords are being written. |
| 55:54 | 2 | Skip | This field indicates the number of bytes in the initial dword that are to be masked (disabled). The possible values indicate the following:<br>0 = No bytes masked<br>1 = Least significant byte of dword masked<br>2 = Least significant 2 bytes of dword masked<br>3 = Least significant 3 bytes of dword masked<br>If a single dword is being written, then the skip and drop fields reference the same dword. In this case, the logical "or" of the skip and drop masks are applied to the dword being written. |
| 57:56 | 2 | Drop | This field indicates the number of bytes in the final dword that are to be masked (disabled). The possible values indicate the following:<br>0 = No bytes masked<br>1 = Most significant byte of dword masked<br>2 = Most significant 2 bytes of dword masked<br>3 = Most significant 3 bytes of dword masked<br>If a single dword is being written, then the skip and drop fields reference the same dword. In this case, the logical "or" of the skip and drop masks are applied to the dword being written. |
| 58 | 1 | Write Type | The write type field indicates whether bits 57:48 of the write header contains a 6 bit dword count with skip and drop masks (bit is set), or a 10 bit, dword aligned size (bit is clear). |
| 63:59 | 5 | Transaction Number | Transaction number 0 indicates that the write packet is an isolated transaction. That is, it is not part of a sequenced write.<br>A non-zero transaction number indicates that this packet is the first in a series of write transactions. All subsequent writes in the series will share this packet's transaction number. |

D. SDP Sequenced Write Packets

FIGS. 16 and 17 show exemplary simple sequenced write data packet formats, described in more detail in Table 11.

TABLE 11

SDP Sequenced Write Packet Field Descriptions

| Bit Positions | Bit field width | Field Name | Description |
| --- | --- | --- | --- |
| 1:0 | 2 | Type | This field indicates the type of the associated SDP packet. The possible types are:<br>0 = Read Request<br>1 = Read Completion<br>2 = Write<br>3 = Sequenced Write |
| 7:2 | 38 | Decomposition Sequence Number | This field indicates the relative position in a decomposition sequence of the associated packet. For a given sequenced write, all sequence numbers must be strictly sequential with the exception of sequence numbers wrapping from sequence number 63 to 0. Sequence numbers wrap and hence indeterminately large write sequences are possible. Following initialization of a write sequence by a write packet with a non-zero transaction number, the decomposition sequence number of the initial sequenced write packet is 0. |
| 14:8 | 7 | Pipe Index | This field indicates the pipe index for the access. |
| 15 | 1 | CRC | This bit indicates whether the associated packet is protected by a CRC-32 value. When set, there is an additional dword of CRC appended to the packet's payload. When clear, the encapsulated packet ends immediately after the payload. |
| 56:48 | 9 | Payload Quadwords | If sequenced write type = 0, then this field indicates the number of quadword aligned quadwords in the packet's payload. All bytes in the payload are valid. |
| 57 | 1 | End | If sequenced write type = 0, then this bit, when set, indicates that this is the last write in the sequence, or when clear, indicates that additional packets for this sequence are to follow. |
| 55:48 | 8 | Payload Dwords | If sequenced write type = 1, then this field indicates the number of dword aligned bytes in the payload. The least drop field indicates whether the final dword of the sequenced write is a partial dword. |
| 57:56 | 2 | Drop | If sequenced write type = 1, then this field indicates the number of bytes in the final dword that are to be masked (disabled). The possible values indicate the following:<br>0 = No bytes masked<br>1 = Most significant byte of dword masked<br>2 = Most significant 2 bytes of dword masked<br>3 = Most significant 3 bytes of dword masked<br>If a single dword is being written, then the skip and drop fields reference the same dword. In this case, the logical "or" of the skip and drop masks are applied to the dword being written. |
| 58 | 1 | Sequenced Write Type | The sequenced write type field indicates whether bits 57:48 of the sequenced write header contains a 2-bit drop field and an 8-bit dword count field (bit is set), or a termination bit and a 9-bit quadword count (bit is clear). If the sequenced write type bit is set, then the associated packet is the final packet of the sequenced write sequence. |
| 63:59 | 5 | Transaction Number | Transaction number 0 indicates that the write packet is an isolated transaction. That is, it is not part of a sequenced write.<br>A non-zero transaction number indicates that this packet is the first in a series of write transactions. All subsequent writes in the series will share this packet's transaction number. |

Having now described preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, RAM, ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner. For illustrative purposes the present invention is embodied in the system configuration, method of operation and product or computer-readable medium, such as floppy disks, conventional hard disks, CD-ROMS, Flash ROMS, nonvolatile ROM, RAM and any other equivalent computer memory device. It will be appreciated that the system, method of operation and product may vary as to the details of its configuration and operation without departing from the basic concepts disclosed herein.

In the manner described above, the present invention thus provides a system and method to select a fabric master. While this invention has been described with reference to the preferred embodiments, these are illustrative only and not limiting, having been presented by way of example. Other modifications will become apparent to those skilled in the art by study of the specification and drawings. It is thus intended that the following appended claims include such modifications as fall within the spirit and scope of the present invention.

What we claim is:

1. An apparatus, comprising:
   a switch having a plurality of ports, wherein for a unicast packet to be routed:
      the switch is configured to receive the unicast packet on a first of the plurality of ports, the unicast packet including header data including path routing information usable to route the unicast packet from an origin node to an endpoint node within a network, and wherein the path routing information includes a first turn value and a bit count value;
      wherein the switch is configured, based on an identifier for the first port, the first turn value, and the number of the plurality of ports, to transmit the unicast packet on a second of the plurality of ports, wherein the switch is configured to select the first turn value using the bit count value;
   and wherein for a multicast packet to be routed:
      the switch is configured to receive the multicast packet and transmit one or more copies of the multicast packet, respectively, on one or more of the plurality of ports based on multicast group information contained in the multicast packet and based on multicast routing information maintained by the switch, wherein the multicast routing information includes a plurality of entries corresponding to a plurality of multicast groups.

2. The apparatus of claim 1, the path routing information including a plurality of turn values that includes the first turn value, wherein each of the plurality of turn values corresponds to a respective network device within a path for the packet, and wherein a given one of the respective network devices in the path that receives the packet on a corresponding input port is configured to use the bit count value to select one of the plurality of turn values as a current turn value, and wherein the given network device is further configured to transmit the packet on an output port of the given network device, wherein the output port is specified by the current turn value, the corresponding input port of the given network device, and the number of ports of the given network device.

3. The apparatus of claim 1, wherein the multicast routing information includes one or more multicast distribution vectors.

4. A system, comprising:
   a switch having a plurality of ports including a first port and a second port, wherein the switch is configured to receive a unicast packet on the first port, wherein the unicast packet includes header data comprising path routing information that is usable to route the unicast packet from an origin node to an endpoint node within a network, and wherein the path routing information includes a turn pool comprising a plurality of turn values;
   wherein the switch is configured to select, using a received bit count value, one of the plurality of turn values, and wherein the switch is further configured, based on the selected turn value, an identifier for the first port, and the number of the plurality of ports, to select the second port on which to transmit the unicast packet;
   wherein the switch is configured to receive a multicast packet on the first port and select one or more ports other than the first port to route the multicast packet, wherein selecting the one or more ports is based on multicast group information contained in the multicast packet and based on multicast routing information maintained by the switch, wherein the multicast routing information includes a plurality of entries corresponding to a plurality of multicast groups.

5. The system of claim 4, wherein the header data is comprised of a credit length, the bit count value, an operation, a Path Identifier (PID) index, a Maximum Transmission Unit (MTU) and an Extended Unique Identifier (EUI).

6. The system of claim 4, wherein the header data further comprises the received bit count value.

7. A switch, comprising:
   first means for receiving a unicast packet on a first port of a plurality of ports of the switch, the unicast packet comprising path routing information usable to route the unicast packet from an origin node to an endpoint node, and wherein the path routing information comprises a turn pool comprising a plurality of turn values;
   second means for selecting one of the plurality of turn values in the turn pool, wherein said selecting uses a received bit count value;
   third means for using the selected turn value, an identifier of the first port, and the number of the plurality of ports to select a second port of the plurality of ports on which to transmit the unicast packet;
   fourth means for transmitting the unicast packet on the second port; and
   fifth means for receiving a multicast packet on the first port and transmitting the multicast packet over one or more of the plurality of ports, wherein said transmitting the multicast packet is based on multicast information contained in the multicast packet and is based on multicast routing information accessible to the switch, wherein the multicast routing information includes multicast group information.

8. The switch of claim 7, further comprising:
   sixth means for modifying the path routing information prior to transmitting the packet, wherein the path routing information comprises the bit count value.

9. A method, comprising:
   receiving, at a switch within a network, an encapsulated packet, wherein the encapsulated packet includes path routing information that includes a plurality of turn values, and wherein the encapsulated packet is received at first of a plurality of ports of the switch;

the switch selecting one of the plurality of turn values using a bit count value included in the path routing information;

the switch determining a second port of the plurality of ports using the selected turn value, an identifier for the first port, and the number of the plurality of ports; and the switch transmitting the encapsulated packet via the second port;

wherein the switch is configured to receive a multicast packet and transmit one or more copies of the multicast packet, respectively, on one or more of the plurality of ports based on multicast group information contained in the multicast packet and based on multicast routing information that the switch is configured to maintain, wherein the multicast routing information includes a plurality of entries usable to store information corresponding to a plurality of multicast groups.

10. The method of claim 9, further comprising modifying the bit count value prior to transmitting the encapsulated packet via the second port.

11. The method of claim 9, wherein the multicast packet includes header data that is different than the header data included in the unicast packet.

12. The method of claim 9, wherein the switch is coupled to the destination.

13. A method of path routing an encapsulated packet from a source to a destination within a fabric having at least one switch, the method comprising:

receiving an encapsulated packet at a first of a plurality of ports of the at least one switch, wherein the encapsulated packet includes a header including a first turn value;

selecting the first turn value using a received bit count value;

determining a second of the plurality of ports using the first turn value, an identifier for the first port, and the number of the plurality of ports; and transmitting the encapsulated packet from the at least one switch via the second port;

wherein the at least one switch is configured to distinguish between the received encapsulated packet and a multicast packet received by the at least one switch, and wherein the at least one switch is configured to transmit one or more copies of the received multicast packet, respectively, on one or more of the plurality of ports of the at least one switch based at least on multicast routing information that the at least one switch is configured to maintain, wherein the multicast routing information includes a plurality of entries usable to store information corresponding to a plurality of multicast groups.

14. The method of claim 13, wherein the header further comprises the bit count value.

15. The method of claim 14, wherein the routing information in the transmitted encapsulated packet further comprises a turn pool including the plurality of turn values, and wherein the destination is configured to use the turn pool and the bit count value of the packet to create a second header and encapsulate the second header within a second packet to be routed from the destination to the source.

16. The method of claim 13, further comprising modifying the header prior to transmitting the encapsulated packet via the second port.

17. The method of claim 13, wherein the fabric comprises a plurality of switches, and the method further comprises repeating the receiving, the determining, and the transmitting at various ones of the plurality of switches with corresponding ones of a plurality of turn values until the encapsulated packet reaches the destination, wherein the plurality of turn values includes the first turn value, and wherein the plurality of turn values are located in the header.

18. The method of claim 13, wherein the header includes a turn pool including a plurality of turn values that includes the first turn value.

* * * * *